United States Patent Office 2,977,319
Patented Mar. 28, 1961

2,977,319

PROCESS FOR THE OPTICAL BRIGHTENING OF MATERIALS OF POLYACRYLONITRILE OR POLYVINYL CHLORIDE

Franz Ackermann, Binningen, and Adolf Emil Siegrist, Basel, Switzerland, assignors to Ciba Limited, Basel, Switzerland, a firm of Switzerland No Drawing. Filed Feb. 6, 1956, Ser. No. 563,457

Claims priority, application Switzerland Feb. 15, 1955

8 Claims. (Cl. 252—301.2)

This invention is based on the observation that materials of polyacrylonitrile or of mixtures of polyacrylonitrile and polyvinyl chloride can be improved as regards optical properties with valuable results when such a material is treated with a non-quaternary compound having no dyestuff character, which is colorless or only slightly colored, contains no acid salt-forming, water-solubilizing group, which in solution or on a substratum fluoresces green-blue to violet in daylight or ultra-violet light and which contains at least one five-membered heterocyclic ring consisting of two adjacent carbon atoms which are at the same time ring members of a benzene ring, a nitrogen atom attached to one of the two mentioned carbon atoms, an oxygen or sulfur atom attached to the other of the two mentioned carbon atoms and a carbon atom attached to both hetero atoms, which latter carbon atom is also attached to a radical which contains at least three conjugated double bonds which are also in conjugation with the $>C=N-$ bond of the heterocyclic ring.

The material to be improved by the use of the present process can exist in any stage of processing, it being obviously advantageous to treat it in the described manner at a stage when all other treatments have been completed which would have the effect of removing again the agent used according to the invention or would have an unfavorable effect upon it. The agents used can for example be added to the materials to be improved either before or during the shaping thereof. Thus they can be added to the moulding mass to be used in the manufacture of foils or shaped bodies or can be dissolved or finely distributed in a spinning mass before the spinning thereof.

The present process has proved to be of especial advantage for the improvement of textile fibers of the specified composition.

Fibers can be used in the application of the present process which either consist of polyacrylonitrile alone or of fiber mixtures consisting to a substantial extent of polyacrylonitrile fibers, or of fibers consisting of copolymers containing other compounds in addition to polyacrylonitrile.

The compounds used according to this invention for the improvement of the specified materials must satisfy the requirements set forth in their above description. They must contain no acid salt-forming or water-solubilizing groups, that is to say no sulfonic acid or carboxylic acid groups. Moreover, they must at the most be only slightly colored and must have no dyestuff character, i.e. they should not dye the material under treatment when applied in the customary concentrations. The compounds have as a rule basic character and can be used in the present process either as free bases or in the form of salts which are capable of the formation of the free bases. As above specified, however, the use is excluded from the present process of the quaternary salts obtainable from these compounds (oxazolium or thiazolium compounds).

As stated above the compounds used in the improvement process of this invention contain at least one, for example a single or preferably two, 5-membered heterocyclic rings and these rings possess a structure which corresponds to one or other of the following formulae (1)
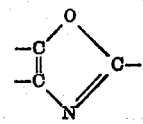

and (2)
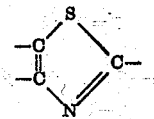

and are comprised within the definition of oxazole and thiazole rings so far as chemical properties are concerned. The two adjacent carbon atoms are at the same time ring members of a benzene ring and the carbon atom between the hetero atoms is attached to a radical which contains at least three conjugated double bonds which are also in conjugation with the $-N=C-$ bond of the oxazole or thiazole ring. Also in the case of the external conjugated double bonds it is not necessary that the double bond shall lie in an open chain; a benzene radical attached to the mentioned carbon atom of the heterocyclic ring is also to be understood in this sense as a radical containing three conjugated double bonds.

Furthermore in the case of the configuration last mentioned, or generally in the case where only three conjugated double bonds exist in the mentioned radical, it is of advantage for this radical to contain further atom groupings which increase the fluorescence.

As will be understood from the above remarks, in the present process advantageously compounds of the formula (3)
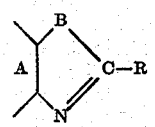

are used in which A indicates a benzene radical condensed with the hetero ring as shown by the valence bonds, R is a substituent with at least three conjugated double bonds which are also in conjugation with the $>C=N-$ bond of the hetero ring and B is a sulfur atom or any oxygen atom.

As above indicated, when four and more conjugated double bonds are present in the radical R, the presence of atom groupings which increase the fluorescence is not necessary, whereas their presence is advantageous when only three conjugated double bonds are present in the radical R. Under the expression atom groupings which increase the fluorescence are to be understood alkylated and acylated amino groups, hydroxyl and alkoxy groups, if they are attached to a carbon atom which is contained in the system of the conjugated double bonds. Good results are obtained in general with such compounds of the Formula 3 of which the radical R is an aromatic radical of the benzene series containing one to three benzene nuclei and at least one atom grouping which increases the fluorescence, which radical is attached through a ring carbon atom to the hetero ring, or alternatively a styryl radical. Atom groupings which contain at least three conjugated double bonds and which can be directly attached to the 2-carbon atom of the hetero ring of the above specified general Formula 3, include for example the following:

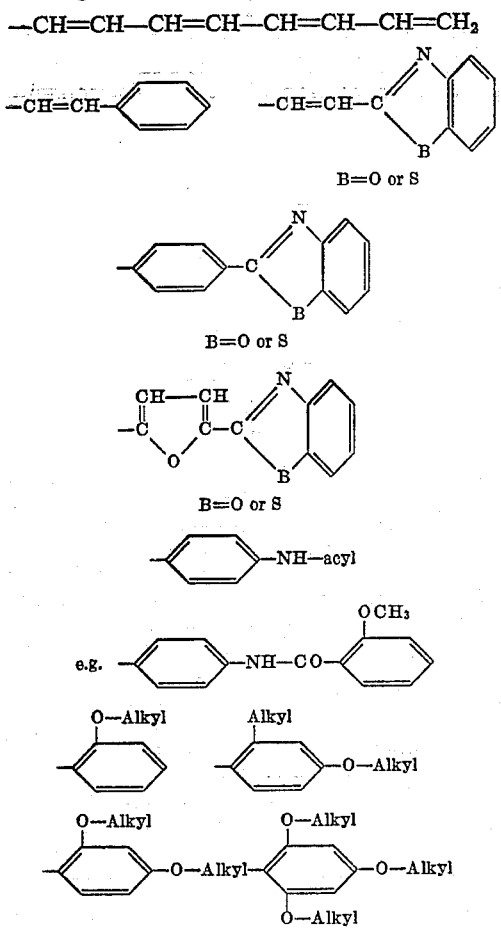

Since the double bonds of the benzene radical A of the above-mentioned general formulae are in conjugation with the double bond of the hetero ring, by suitable substitution of this radical A an increase of the fluorescence can also be attained. As substituents in the radical A there are concerned alkyl, alkoxy, alkylamino or acylamino groups or halogen atoms.

The condition that the radical R shall contain at least three conjugated double bonds which are also in conjugation with the double bond of the hetero ring, is fulfilled in an especially advantageous manner when two heterocyclic-aromatic radicals of the specified type are attached together through their carbon atoms in 2-position by means of a radical in such a way that a continuous chain of conjugated double bonds exists. Such compounds correspond to the formula (4)

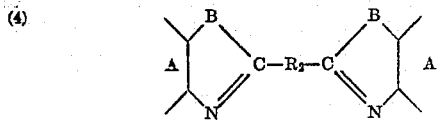

in which A has the specified significance, B represents an oxygen atom, and $R_2$ indicates a radical containing at least two carbon atoms and the two heterocyclic rings, together with the radical $R_2$, contain a continuous chain of conjugated double bonds.

In these compounds, the radical $R_2$, for example, can be a radical consisting of one or more conjugated ethylene radicals, for example of the formula

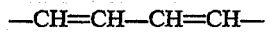

a 1:1'-diphenyl radical attached in 4- and 4'-position to the hetero ring, a radical of the formula

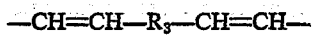

in which $R_3$ indicates a benzene nucleus attached in p-position to the ethylene groups, or a thiophene ring attached in 2- and 5-position to the hetero rings. Particularly good results are given by compounds of the Formula 4 of which the radical $R_2$ has the composition

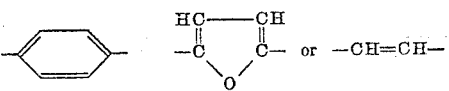

Especially valuable results are generally obtained with those $\alpha:\beta$-di-[benzoxazolyl-(2)]-ethylenes of the Formula 4 whose benzene radicals A are substituted by low molecular alkyl groups, particularly methyl groups, which are preferably in the 5-positions of the benzoxazole radicals.

The compounds to be used in the present process are known in large numbers and others can be prepared by customary methods known per se.

If it is a question of improving textile fibers by the present process which can exist as staple fibers or monofilaments, in the crude state or in the form of yarns or fabrics, this operation is conducted with advantage in an aqueous medium in which the compounds to be used are dissolved or suspended. If desired dispersing agents can be added in the treatment, for example soaps, polyglycol ethers of fatty alcohols or fatty amines, cellulose sulfite waste liquor or condensation products with formaldehyde of naphthalene sulfonic acids which may be alkylated.

It is of particular advantage, especially when the treatment of the fibers is exclusively for the purpose of improving the optical properties, to work in weakly alkaline to acid baths, preferably weakly acid baths, for example containing acetic acid or formic acid. It is likewise of advantage if the treatment takes place at elevated temperature, for example at the boiling temperature of the bath or in the neighbourhood thereof (about 90° C.). It is surprising that the compounds of the composition set forth above possess a good affinity for the fibers and can be fixed thereon in a similar manner to dyestuffs. In this connection it may be remarked that in the case of these synthetic fibers many optical improving and brightening agents which are of good applicability for other fiber materials, cannot be used for the reason that in this case they cannot be fixed on the fiber or do not give rise to the desired effect. The fastness to light of the materials treated according to the present process is also good, the effect persisting even after long exposure to light.

The quantity of the improving agent to be used, calculated on the material to be treated, can vary within wide limits. Even with very small quantities, in some cases, for example, of 0.01 percent, a distinct and permanent effect can be attained. Although quantities of more than about 3 percent are in general not disadvantageous, they offer no advantages compared with the normal quantities.

As indicated above, the present process can advantageously be combined with other processing methods. Thus the compounds to be used according to the present invention can also be applied as follows:

(a) In admixture with dyestuffs or as additions to dyebaths or printing, discharge or reserve pastes. Further also for the after-treatment of dyeings, prints or discharge prints, especially in the soaping process. Thus, for example, polyacrylonitrile fibers can be simultaneously dyed and improved as regards optical properties in an acid medium and are dyed in the same bath with azo dyestuffs which are free from sulfonic acid groups and which contain as salt-forming groups amino groups and form with acids in an acid medium salts which at the most are partially hydrolyzable, these dyestuffs being fixed on the fiber in the form of their salts.

(b) In admixture with chemical bleaching agents or as additions to bleaching baths.

(c) In combination with washing agents: The washing agents and brightening agents can be separately added to the washing baths to be used. It is also advantageous to use washing agents which contain brightening agents admixed therewith. As washing agents are suitable for example, soaps, salts of sulfonate washing agents, as for example, of sulfonated benzimidazoles substituted on the 2-carbon atom by higher alkyl radicals, also salts of monocarboxylic acid esters of 4-sulfophthalic acid with higher fatty alcohols or salts of fatty alcohol sulfonates, alkylaryl sulfonic acids or condensation products of higher fatty acids with aliphatic hydroxy- or amino- sulfonic acids. Non-ionic washing agents can also be used, for example polyglycol ethers which are derived from ethylene oxide and higher fatty alcohols, alkyl phenols or fatty amines.

The washing agents of the above specified type can also contain the customary washing agent additions, such as alkali metal carbonates, phosphates, pyrophosphates, polyphosphates, metaphosphates, silicates, perborates or percarbonates, so long as the brightening agents are compatible with such additions. It is also possible to prepare washing agents which consist solely or for the most part of inorganic compounds of cleansing effect and the brightening agents. The production of the mixtures of the washing agents and optical brightening agents takes place in a simple manner by mixing and/or grinding of the components together. In this case it may be of advantage to use one or the other component in the dissolved or molten condition for the purpose of facilitating distribution.

In general a small addition of the optical improving agents to the washing agents suffices. There are concerned, for example, quantities of 0.1 to 5 percent calculated on the washing agent. Also smaller quantities, for example, 0.01 percent or even less can be added. Also mixtures with other known brightening agents can be used. The washing agents are used as in the customary washing processes. In this manner materials to be cleansed can be simultaneously washed and brightened.

When the present process is combined with other treatment or improvement methods, for example those set forth above under (a) to (c), the combined treatment advantageously takes place with the aid of suitable constituted preparations. These stable preparations are characterized by a content of compounds of the type specified above, for example, particularly derivatives of oxazole and also further textile treating agents, for example dyestuffs, chemical bleaching agents, finishing agents or especially washing agents.

The following examples illustrate the invention, the parts and percentages being by weight unless otherwise stated.

Example 1

Polyacrylonitrile fabric, for example "Orlon" is treated at a bath ratio 1:50 with 0.01 percent of α:β-di-[benzoxazolyl-(2)]-ethylene for 30 minutes at about 90° C. in a bath containing per liter 1 gram of 85 percent formic acid. The material is then rinsed and dried. The resulting material possesses a higher white content than the untreated material.

Example 2

Polyacrylonitrile fabric, for example "Orlon," is treated for 30 minutes at 90–95° C. in a bath ratio 1:40 in a bath containing 0.2 percent of 2-[4'-(4''-methoxy-benzoyl)-amino-phenyl]-6-methyl benzothiazole of the formula

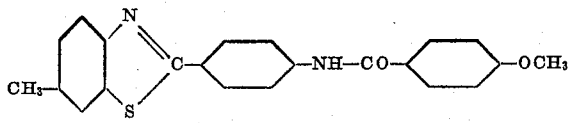

and 7 percent of 85 percent formic acid. The fabric is then rinsed and dried. The material thus treated has a whiter appearance than the untreated material.

Example 3

A mixed fabric of polyacrylic and polyvinyl fibers having the properties of "Dynel" is treated in a bath ratio 1:30 for 30 minutes at 90–95° C. with 0.1 percent of α:β-di-[benzoxazyl-(2)]-ethylene in a bath containing 2 cc. of 85 percent formic acid per liter, then rinsed and dried. The material has a higher white content than the untreated fabric.

Example 4

12 parts of α:β-di-[5-methyl-benzoxazolyl-(2)]-ethylene are processed to a finely dispersed paste with 12 parts of an addition product from about 30 mols of ethylene oxide to a mixture of saturated fatty alcohols the majority of which have 18 carbon atoms and with 76 parts of water.

50 grams of "Orlon" fabric is treated for 30 minutes at 80–95° C. in a bath consisting of 1500 cc. water
3 grams formic acid 85%
3 grams sodium chlorite
0.1 gram of the above product then rinsed and dried. The material thus treated is whiter than a material which has been treated without the addition of the above product.

The α:β-di-[5-methyl-benzoxazolyl-(2)]-ethylene can be prepared as follows:

To a solution of 123 parts of 1-amino-2-hydroxy-5-methyl benzene in 1200 parts of chlorobenzene there are added at 125–130° C., 76 parts of fumaric acid dichloride dropwise in the course of one hour with stirring and the exclusion of air, and the whole is maintained at a gentle boil for another 6 hours. The resulting yellowish condensation product of the formula

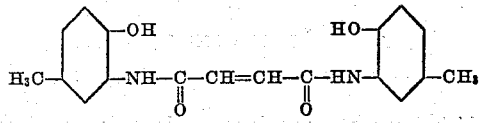

is filtered off, washed with chlorobenzene, alcohol and water and dried.

To a melt of 10 parts of ethylene glycol and 150 parts of zinc chloride there are added at 155 to 160° C. in the course of about ¼ hour 30 parts of the acylamino compound of the above formula and the mixture is stirred for 10 hours at 160–165° C. 600 parts of cold water are then added dropwise, the temperature being reduced. Concentrated hydrochloric acid is then added until the reaction is acid. The mixture is stirred for another hour at about 60° C., the separated product is filtered off, washed with water until the filtrate shows a neutral reaction and crystallized, if necessary, from dioxane. There is obtained α:β-di-[5-methyl-benzoxazolyl-(2)] - ethylene in the form of pale crystals which melt at 183° C. The solution in dioxane exhibits a bluish fluorescence.

Example 5

0.15 part of α:β-di-[5-methyl-benzoxazolyl - (2)] - ethylene dissolved in 2 parts of dimethyl formamide are added to a solution of 150 parts of a polyacrylonitrile powder ("Orlon" powder) and 1000 parts of dimethyl formamide. The film produced from this mass has a brighter appearance than a comparative film which does not contain the oxazole compound.

What is claimed is:

1. A process for the optical brightening of polyacrylonitrile fibers which process comprises treating the fibers with a non-quaternary compound which is free from acid salt-forming, water solubilizing groups and groups imparting dyestuff character, which in solution fluoresces green-blue to violet and which corresponds to the formula

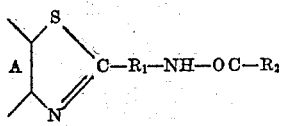

in which A is a monocyclic aromatic radical condensed in the manner indicated by the valence bonds with the thiazole ring, $R_1$ and $R_2$ are each a monocyclic aromatic radical, $R_1$ being bound to the thiazole ring and the —NH—OC— group in para-position.

2. A process for the optical brightening of polyacrylonitrile fibers which process comprises treating the fibers with a non-quaternary compound which is free from acid salt-forming, water solubilizing groups and groups imparting dyestuff character, which in solution fluoresces green-blue to violet and which corresponds to the formula

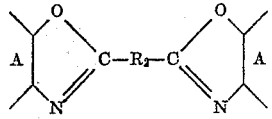

in which A is a monocyclic aromatic radical condensed in the manner indicated by the valence bonds with the oxazole ring, $R_2$ is a radical containing at least two carbon atoms and the two oxazole rings together with the radical $R_2$ contain a continuous chain of conjugated double bonds.

3. A process for the optical brightening of polyacrylonitrile fibers which process comprises treating the fibers with a non-quaternary compound which is free from acid salt-forming, water solubilizing groups and groups imparting dyestuff character, which in solution fluoresces green-blue to violet and which corresponds to the formula

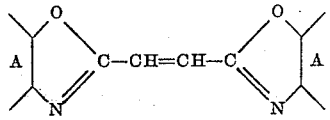

in which A is a monocyclic aromatic radical condensed in the manner indicated by the valence bonds with the oxazole ring.

4. A process for the optical brightening of polyacrylonitrile fibers which comprises applying to said fibers the optical brightening agent of the formula

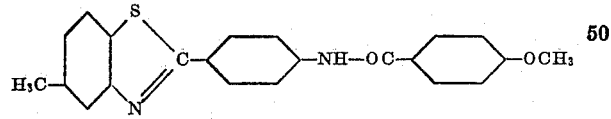

5. A process for the optical brightening of polyacrylonitrile fibers which comprises applying to said fibers in finely dispersed state the optical brightening agent of the formula

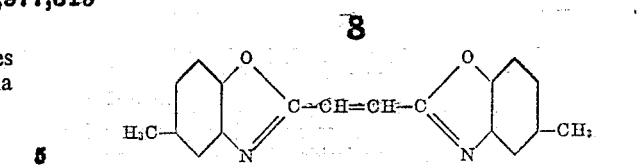

6. A preparation suitable for the optical brightening of polyacrylonitrile fibers which preparation contains in addition to at least one more textile treating agent as an optical brightening agent a non-quaternary compound which is free from acid salt-forming, water-solubilizing groups and groups imparting dyestuff character, which in solution fluoresces green-blue to violet and which corresponds to the formula

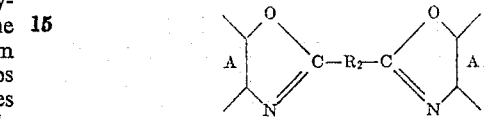

in which A is a monocyclic aromatic radical condensed in the manner indicated by the valence bonds with the oxazole ring, $R_2$ is a radical containing at least two carbon atoms and the two oxazole rings together with the radical $R_2$ contain a continuous chain of conjugated double bonds.

7. A preparation suitable for the optical brightening of polyacrylonitrile fibers, which preparation contains in addition to at least one more textile treating agent as an optical brightening agent a non-quaternary compound which is free from acid salt-forming, water-solubilizing groups and groups imparting dyestuff character, which in solution fluoresces green-blue to violet and which corresponds to the formula

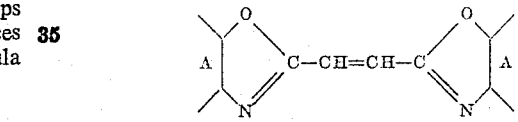

in which A is a monocyclic aromatic radical condensed in the manner indicated by the valence bonds with the oxazole ring.

8. A preparation suitable for the optical brightening of polyacrylonitrile fibers, which preparation contains in addition to at least one more textile treating agent as an optical brightening agent the compound of the formula

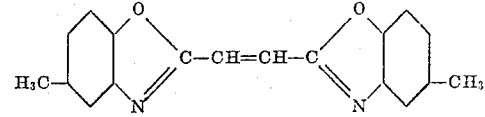

in a finely dispersed state.

References Cited in the file of this patent

UNITED STATES PATENTS

| | | |
|---|---|---|
| 2,604,454 | Ackermann | July 22, 1952 |
| 2,773,869 | Leavitt | Dec. 11, 1956 |